United States Patent [19]

Hoen

[11] Patent Number: 4,657,462
[45] Date of Patent: Apr. 14, 1987

[54] QUARTER-TURN FASTENER
[75] Inventor: Cuyler Hoen, Rennesselaer, N.Y.
[73] Assignee: Simmons Fastener Corporation, Albany, N.Y.
[21] Appl. No.: 763,559
[22] Filed: Aug. 8, 1985
[51] Int. Cl.[4] .............................................. F16B 21/02
[52] U.S. Cl. .................... 411/552; 411/349; 24/596
[58] Field of Search ............... 411/349, 549, 550, 552, 411/553; 24/590, 596, 11

[56] References Cited

U.S. PATENT DOCUMENTS

| | | | |
|---|---|---|---|
| 1,803,431 | 5/1931 | Hill | 411/349 |
| 1,895,672 | 1/1933 | Loughman | 411/349 X |
| 2,092,370 | 9/1937 | Cash | 411/552 X |
| 2,309,733 | 2/1943 | Jones | 411/549 |
| 2,454,223 | 11/1948 | Shippee | 411/349 |
| 2,552,066 | 5/1951 | Sorensen | 411/549 X |
| 2,588,951 | 3/1952 | Anstett | 411/349 X |
| 3,190,167 | 6/1965 | Holton | 411/349 X |
| 3,263,728 | 8/1966 | Lynch | 411/349 |
| 3,434,095 | 3/1969 | DeRose | 411/349 X |
| 3,437,119 | 4/1969 | Dey | 411/349 |
| 3,480,311 | 11/1969 | Lanham | 411/349 X |
| 3,900,131 | 11/1976 | Okamura | 24/590 X |
| 3,900,931 | 8/1975 | Lavoilloite | 411/349 X |
| 4,137,610 | 2/1979 | Hoen | 24/590 |

FOREIGN PATENT DOCUMENTS 335957 10/1930 United Kingdom ................. 24/596

Primary Examiner—Thomas J. Holko
Attorney, Agent, or Firm—Eliot S. Gerber

[57] ABSTRACT

An industrial quarter-turn fastener assembly comprises a sheet metal turn member having a turn head, a shank portion and a nose portion; a cap member through which the shank portion extends; and a helical coil spring. In one embodiment the fastener assembly is a blind fastener which is tilted to pass through a hole in a first panel which hole is smaller than the width of the nose portion and in another embodiment the shank portion is held to the first panel by a locking ring. To secure a second panel to the first panel, the nose portion is pushed through a slot hole in the second panel and the fastener turn head is rotated a quarter turn.

8 Claims, 9 Drawing Figures

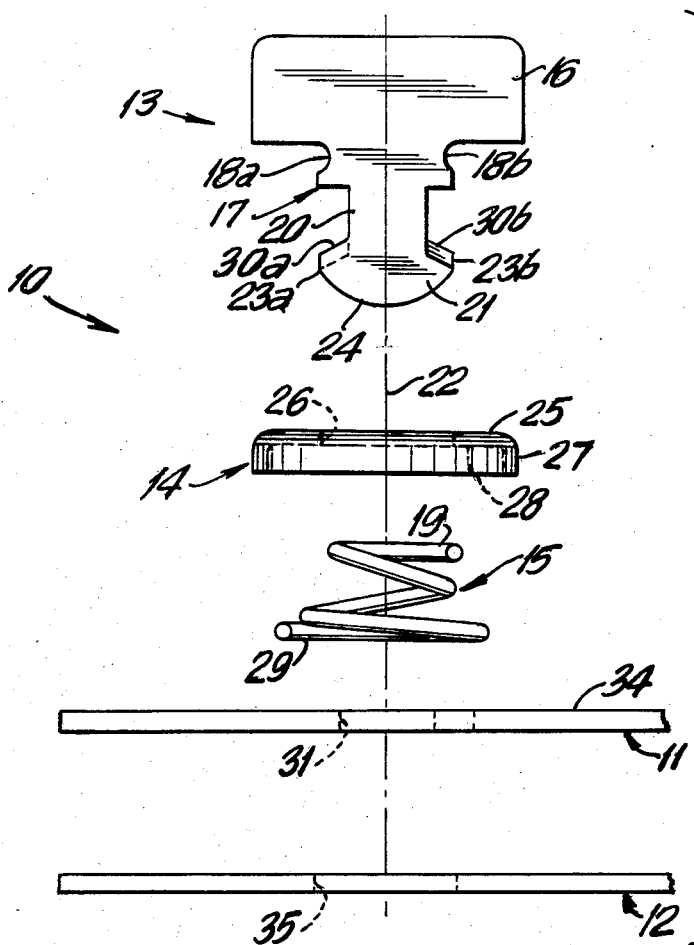
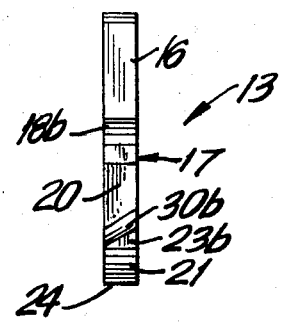
FIG. 1A
FIG. 1
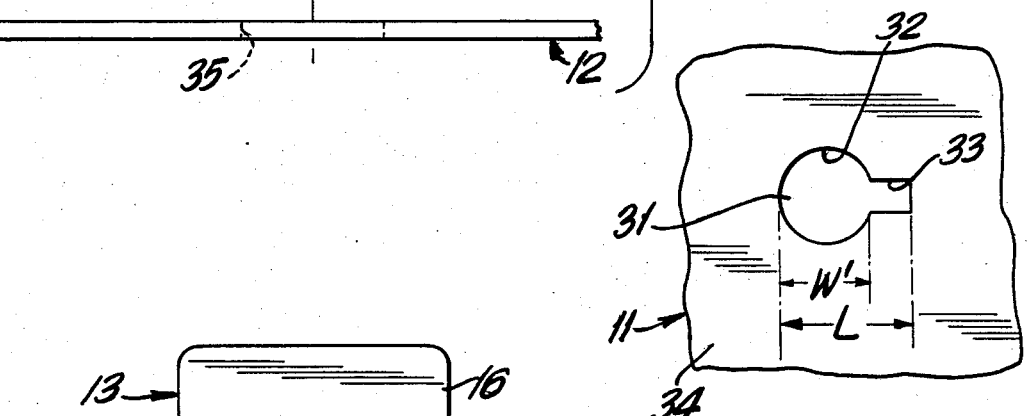
FIG. 3
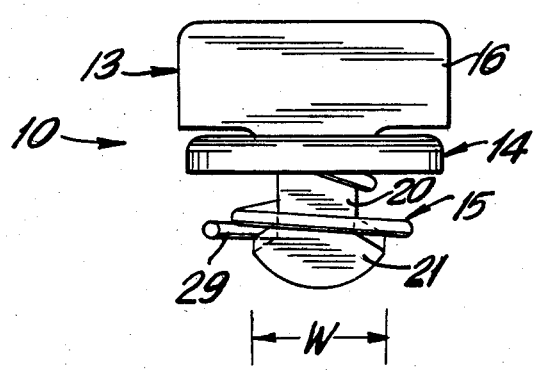
FIG. 2
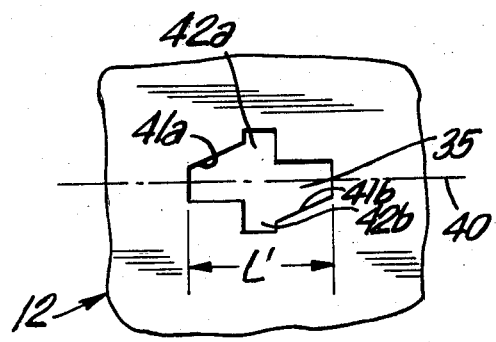
FIG. 4

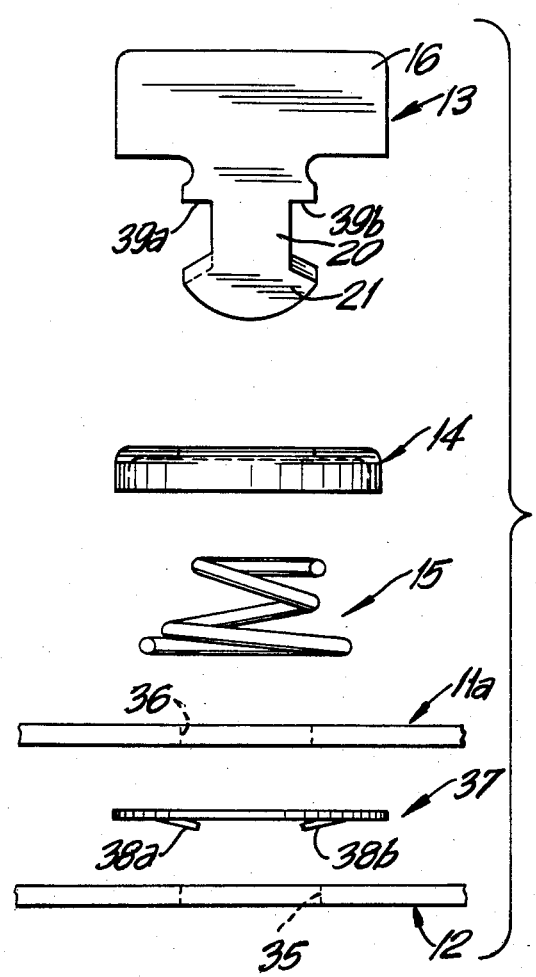
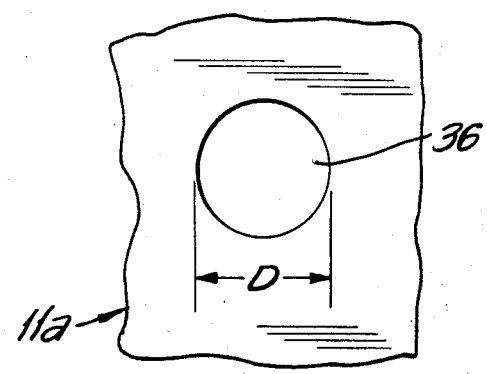
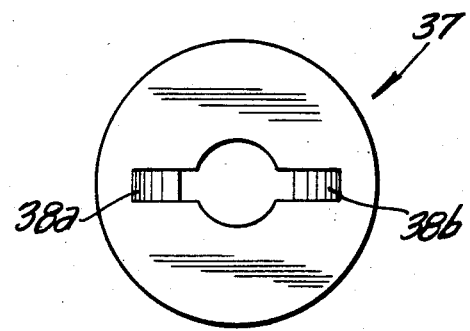
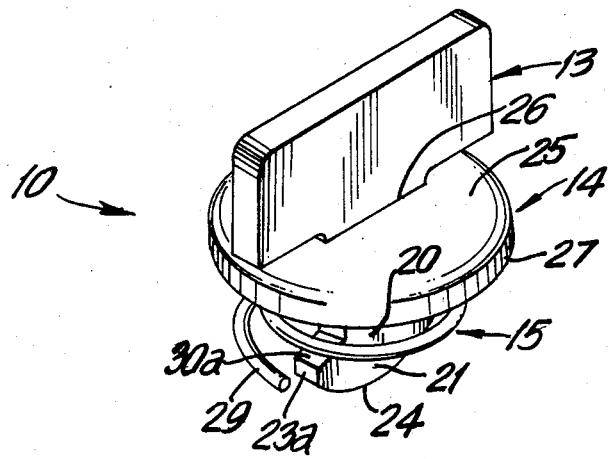

QUARTER-TURN FASTENER

BACKGROUND OF THE INVENTION

The present invention relates to industrial fasteners and more particularly to quarter-turn industrial panel fasteners which are used to removably secure two panels.

At the present time there are a number of commercially available industrial fasteners to secure two panels, and many such fasteners have been proposed in prior patents. The panels may be, for example, machine service or enclosure panels or container panels.

Generally, industrial fasteners of this type consist of two separated members one of which is attached to the first panel and the second of which is attached to the second panel. Such fasteners may be used to obtain a tight seal while allowing for quick access. Frequently, such fasteners are "quarter turn" fasteners which are locked by a 90° turn and unlocked by a 90° turn in the opposite direction. Some of these fasteners are "blind" fasteners which may be secured on the panels from one face of the panel without seeing its opposite face.

Two-member fasteners may be generally classified to be of one of two types. The first is a spring socket type in which the receptacle secured to one panel or formed as a spring in the panel grips and exerts a tension on the stud member, as is disclosed in U.S. Pat. No. 2,200,272 to Oddie; U.S. Pat. No. 2,413,510 to Luce; U.S. Pat. No. 2,334,676 to Jones; and U.S. Pat. No. 3,900,931 to Lavoillote.

An alternative general type of fastener, illustrated by U.S. Pat. No. 2,486,411 to Huelster; U.S. Pat. No. 3,136,017 to Preziosi; U.S. Pat. No. 2,975,667 to Bross; U.S. Pat. No. 3,675,280 to Winslade and U.S. Pat. No. 4,137,610 to Hoen, discloses spring-loaded stud members. However, some of the above-mentioned spring-loaded stud fastener patents also include spring retaining housings and most require the lateral stud projections to traverse a ramped receptacle for fastener tightening.

It has also been suggested that the turn member of an industrial fastener may be stamped from flat sheet metal, as in U.S. Pat. No. 3,900,931 to Lavoillotte.

Presently commercially available fasteners are satisfactory for many purposes. However, there is need for a quarter-turn blind fastener which is rugged, easily operable, simple, inexpensive and readily installed and which may be made from relatively low-cost materials without relatively expensive machining.

SUMMARY OF THE INVENTION

The present invention provides an industrial fastener which is a single assembly connected to a first panel. The second panel has a hole, but does not have a receptacle. The assembly includes a turn member which is rotated by the user a quarter-turn (90°) to fasten and unfasten the two panels.

The fastener assembly comprises two stamped sheet metal members, which are the turn member and a cap, and a helical coil spring. The turn member is a unitary member and includes a turning head means portion and a shank portion. The upper portion of the shank includes two opposed indentations, which acts as the seat for the top turn of the coil spring. The turn member is resiliently disposed with respect to the first panel by the coil spring which is positioned between the cap and the top surface of the first panel.

The turn member has a central shank portion and terminates in a rounded nose portion, allowing easier alignment between the turn member and the hole in the second panel. The upper side of the nose portion has two opposed outwardly extending shoulder portions which have cammed surfaces to provide a mechanical advantage to pull together the two panels.

The turning head means (head portion) of the turn member is such that it accepts rotational force and is preferably a flat plate. Other designs are possible, including a slotted screw head to be turned by a screwdriver or coin, a wing head to be turned by hand, or a hex head to be turned by a socket wrench or other tool.

To withdraw the turn member from the second panel, the user rotates the turn member backwards, enabling the turn member to attain realignment with the elongated opening in the second panel so that the turn member may be withdrawn from the second panel to disengage the two panels.

OBJECTIVES AND FEATURES OF THE INVENTION

It is an objective of the present invention to provide an industrial quarter-turn fastener to removably secure a first panel to a second panel, wherein the fastener is readily connected to the first panel and the second panel has only a hole and does not have a receptacle and which may be used on a range of panel thicknesses.

It is a further objective of the present invention to provide an industrial quarter-turn fastener in which, in one embodiment, the fastener is a blind fastener which may be connected to the first panel by insertion of its turn member through the hole in the first panel and rotation of the turn member, and without any means to secure the fastener to the first panel. In that embodiment the fastener components are held together by the spring so that they may be supplied to the user as an assembly.

It is a further objective of the present invention to provide an industrial quarter-turn fastener in which the parts are few and stamped from sheet metal, except for the spring, so that the fastener is relatively inexpensive and yet will be relatively rugged.

It is a feature of the present invention to provide a fastener system comprising a fastener, a first panel and a second panel, each panel having a hole and a top surface and a bottom surface. The fastener removably secures the first panel to the second panel. The hole in the second panel is in the shape of an elongated slot with its length longer than a width W. The second panel hole has opposite steps to prevent unlocking when subjected to shocks or vibration.

The fastener comprises a turn member, a spring member and a cap member. The turn member has a turn head means by which the turn member may be gripped and rotated, a shank portion having an imaginary axis, and a nose portion having oppositely extending wing portions having a width W. The upper shoulders of the wing portions have oppositely directed cam surfaces.

In a first embodiment the width W of the nose portion is slightly larger than the width of the first panel hole so that the nose portion only fits through a hole slot portion in the first panel with a tilting action relative to its axis. In that first embodiment the spring holds the turn member, cap and spring together as an assembly so that the fastener, except for the panels, may be supplied to the user as an assembly instead of as individual components. In a second embodiment the shank portion is secured to the second panel by a locking ring.

The cap member has a hole through which the turn member shank portion extends. The spring member is a resilient helical coil spring positioned between the cap member and the top of the first panel.

BRIEF DESCRIPTION OF THE DRAWINGS

Other objectives and features of the present invention will be apparent from the following detailed description of the present invention, taken in conjunction with the accompanying drawings.

In the drawings:

FIG. 1 is an exploded side view of the portions of the first embodiment of the fastener system of the present invention;

FIG. 1A is a side view of the turn member of FIG. 1;

FIG. 2 is a front view of the turn member assembly after it has been assembled;

FIG. 3 is a top plan view of a portion of the first panel illustrating the hole in the first panel;

FIG. 4 is a top plan view of a portion of the second panel illustrating the hole in the second panel;

FIG. 5 is a side exploded view of the second embodiment of the present invention;

FIG. 6 is a top plan view of the first panel in the second embodiment illustrating the hole in the first panel;

FIG. 7 is a top plan view of the locking ring of the second embodiment; and

FIG. 8 is a perspective view of the turn member assembly as shown in FIG. 2.

DETAILED DESCRIPTION OF THE INVENTION

As shown in FIG. 1, the fastener system of the first embodiment of the present invention includes a fastener 10, a first panel 11 and a second panel 12, each panel having a top surface and a bottom surface. The fastener 10 comprises a turn member (locking stud) 13, a cap member 14 and a spring member 15.

The turn member 13 is preferably a one-piece unitary single-thickness member stamped from sheet metal. It is a flat sheet metal member, as shown in FIG. 1A, and so may be produced inexpensively. The turn member comprises a head portion 16 (turn head means) which may be gripped by the fingers. Alternatively, other types of head portions may be used, such as a screw head having a slot or a Philips type indentation, or a wider head forming "butterfly wings".

The head portion 16 is connected to the shank portion 17 which has opposed indentations 18a and 18b, to retain the top turn 19 of the spring 15, a center shank portion 20 and a nose portion 21. The nose portion 21 has oppositely directed wing portions 23a and 23b extending from axis 22 and a rounded bottom portion 24. The nose portion 21 has a width W shown on FIG. 2. The turn member 13 is symmetrical about its imaginary central axis 22. The nose portion 21 has two upper shoulder portions 30a and 30b having oppositely faced cam surfaces. The cam surfaces provide a mechanical advantage to pull the two panels together when the fastener is turned and locked.

The cap member 14 is used to retain the spring 15 and present a finished appearance to the fastener. It has a top wall 25, an elongated slot hole 36 through which the shaft portion of the turning member is fitted, and has a descending flange ring 27. Preferably the cap member 14 is stamped from sheet metal and may be chrome-plated.

The spring 15 is a helical coil spring of resilient spring metal. Its top turn 19 is held by the indentations 18a,18b and the underside 28 of the cap 14. Its bottom turn 29 is held by the shoulder portion 30a,30b of the nose portion 21. The spring permits the fastener to be used with different thicknesses of panels, i.e., over a range of panel thicknesses, so that it is not limited to use with panels of a specified single thickness.

The shape of the hole in the second panel 12 is the same in the first and second embodiments. As shown in FIG. 4, it consists of an alongated slot of length L' along the imaginary axis 40 and symmetric to the axis. Steps formed by the slanted walls 41a,41b and slot (groove) portions 42a,42b. The opposite slot portions of the hole prevent the turn member from unlocking when the locked fastener is subjected to shocks or vibration because the cam shoulders fit into those slot portions. The spring 15 retains the shoulder portions 30a,30b of the nose portion 21 in the hole slot portions 42,42b and prevents the turn member from rotating to its unlocked position.

As shown in FIGS. 5-7, in this alternative embodiment, a locking ring 37 is positioned between the plates 11a and 12. The edges 38a,38b of the locking ring 37 grip and retain the shank portion 20 and the ring turns with the turn member. The hole 35 of the panel 12 is shown in FIG. 4.

What is claimed is:

1. A fastener system comprising a fastener, a first panel and a second panel, each panel having a top surface and a bottom surface, the fastener removably securing the first panel to the second panel; the first panel having a hole therethrough having width W and additionally a hole slot portion;

the second panel having a hole therethrough having the shape of an elongated slot with a length longer than said width W of the first panel hole;

the fastener comprising a turn member, a spring member and a cap member, said turn member having as portions thereof a turn head means by which the turn member may be gripped and rotated, a shank portion having an imaginary axis, and a nose portion having oppositely extending wing portions extending from said shank portion, the width W' of said nose portion perpendicular to said axis being greater than the width W of the first panel hole so that said nose portion fits through said hole slot portion only with a tilting action relative to said axis;

said cap member having a hole through which said turn member shank portion extends;

and said spring member being a resilient helical coil spring positioned between said cap member and the top of said first panel.

2. A fastener system as in claim 1 wherein said turn member is a unitary stamped sheet metal single thickness member having a flat head portion as the turn head.

3. A fastener system as in claim 1 wherein said fastener is a quarter-turn fastener which locks and unlocks by 90° turning of the head member.

4. A fastener system as in claim 1 wherein said fastener has opposed indentations near said turn head means to retain the top turn of said spring member.

5. A fastener system as in claim 1 wherein said nose portion has shoulder portions to retain the bottom turn of said spring member.

6. A fastener system comprising a quarter-turn fastener, a first panel and a second panel, each panel having a top and a bottom surface, the fastener removably securing the first panel to the second panel; the first panel having a hole therethrough having width W and additionally having a hole slot portion;

the second panel having a hole therethrough having the shape of an elongated slot with a length longer than said width W of the first panel hole;

the fastener comprising a turn member, a spring member and a cap member, said turn member being a single thickness flat sheet metal member and having as portions thereof a turn head means by which the turn member may be gripped and rotated, a shank portion having an indentation near said turn head means and having an imaginary axis;

and a nose portion having oppositely extending wing portions extending from said shank portion to form shoulder portions, the width W' of said nose portion perpendicular to said axis being greater than the width W of the first panel hole so that said nose portion fits through said hole slot portion only with a tilting action relative to said axis;

said cap member having a hole through which said turn member shank portion extends;

and said spring member being a resilient helical coil spring having a top turn and bottom turn and being positioned between said cap member and the top of said first panel with the top turn of said spring being held in said shank portion indentation and the bottom turn being held on said shank portion shoulder portions.

7. A fastener system as in claims 1 or 6 wherein the hole in the second panel has oppositely directed slot portions perpendicular to said length and wherein said nose portion has oppositely directed shoulder portions on its upper surface, which shoulder portions are retained in said second panel hole slot portions by said spring member.

8. A fastener system as in claim 7 wherein each of said shoulder portions has a cam face thereon.

9. A fastener system comprising a quarter-turn fastener, a first panel and a second panel, each panel having a top and a bottom surface, with the fastener removably securing the first panel to the second panel; the first panel having a hole therethrough having a width W; the second panel having a hole therethrough having the shape of an elongated slot; the fastener comprising a single thickness sheet metal turn member, a spring member, a cap member and a locking ring;

said turn member having as portions thereof a turn head means by which the turn member may be gripped and rotated, a shank portion having an imaginary axis and an end nose portion having oppositely extending wing portions extending from said axis and forming opposite shoulder portions, the width W' of said nose portion perpendicular to said axis being less than the width W of the first panel hole so that it fits through said first panel hole;

said cap member having a hole therethrough through which said turn member shank portion extends;

said spring member having a top turn and a bottom turn and being a resilient helical coil spring positioned between said cap member and the top of said first panel with said bottom turn supported on said shank portion shoulder portions;

said locking ring being positioned on the bottom surface of said first panel and not fastened to said first panel and having a hole therethrough whose edges grip and retain said shank portion;

wherein the hole in the second panel has oppositely directed slot portions perpendicular to said length and wherein said nose portion has oppositely directed shoulder portions on its upper surface, which shoulder portions are retained in said second panel hole slot portions by said spring member.

* * * * *